US006250210B1

(12) United States Patent
Moreth

(10) Patent No.: US 6,250,210 B1
(45) Date of Patent: Jun. 26, 2001

(54) HIGH EFFICIENCY CAROUSEL INFRARED OVEN

(75) Inventor: R. Edward Moreth, Fort Lauderdale, FL (US)

(73) Assignee: Remco Technologies International Inc., Fort Lauderdale, FL (US)

( * ) Notice: Subject to any disclaimer, the term of this patent is extended or adjusted under 35 U.S.C. 154(b) by 0 days.

(21) Appl. No.: 09/679,526

(22) Filed: Oct. 6, 2000

Related U.S. Application Data

(63) Continuation-in-part of application No. 09/225,227, filed on Jan. 4, 1999, now Pat. No. 6,146,677, which is a continuation-in-part of application No. 09/071,638, filed on May 1, 1998, now abandoned.

(51) Int. Cl.⁷ .............................. A23L 1/00; A47J 37/00; A21B 1/10; A21B 1/44; A21B 1/42
(52) U.S. Cl. .............................. 99/331; 99/339; 99/341; 99/427; 99/443 R; 99/483; 99/451; 219/388; 219/400; 126/19 R; 126/21 R
(58) Field of Search ..................... 99/325–333, 339–341, 99/385, 386, 400, 401, 426, 427, 443 R, 443 C, 444–450, 481, 482, 483, 477–479, 451, DIG. 14; 126/21 R, 273 R, 21 A, 19 R, 92 R, 273.5; 219/388, 400, 401

(56) References Cited

U.S. PATENT DOCUMENTS

| 3,524,403 | * | 8/1970 | Treloar | 99/341 |
|---|---|---|---|---|
| 3,552,299 | * | 1/1971 | Patoka | 99/339 |
| 4,305,329 | * | 12/1981 | Fengolio | 99/339 X |
| 4,727,799 | * | 3/1988 | Ohshima | 99/331 |
| 4,924,763 | * | 5/1990 | Bingham | 99/339 X |
| 4,934,260 | * | 6/1990 | Blevins | 99/331 |
| 4,951,648 | * | 8/1990 | Shukla | 99/331 X |
| 5,454,295 | * | 10/1995 | Cox et al. | 99/332 |
| 5,492,055 | * | 2/1996 | Nevin et al. | 99/331 |
| 5,560,285 | * | 10/1996 | Moreth | 99/421 H |
| 5,605,092 | * | 2/1997 | Riccio | 99/401 |
| 5,653,905 | * | 8/1997 | McKinney | 219/400 X |
| 5,872,351 | * | 2/1999 | Sowerby | 219/388 X |

* cited by examiner

*Primary Examiner*—Timothy F. Simone
(74) *Attorney, Agent, or Firm*—M. K. Silverman

(57) ABSTRACT

The instant high efficiency carousel pizza oven is an oven of the open cavity or open input type which permits food access and fluid communication with the atmosphere through a proximal or front opening within the oven housing. The present oven is preferably defined in terms of a method which employs a solid rotating thermal reservoir in the nature of a circular panel capable of storing large amounts of thermal energy per unit of mass. Rotation of the panel assures that hot spots will not develop thereby eliminating scorching of food items cooked thereon. Provided beneath the panel, in thermal communication therewith, and preferably along a radius thereof situated substantially normal to an axis of rotation of the panel, is a flame burner which furnishes greater heat to the panel as a function of increase in distance from the axis to thereby provide cooking of uniform heating to the rotating panel as a function of increase in circumference relative to distance from the axis. Thereby, thermal values are very efficiently transferred from the gas burner flames to the panel which, through conduction, provides heating to the pizza through the bottom surface thereof.

5 Claims, 6 Drawing Sheets

HIGH EFFICIENCY CAROUSEL INFRARED OVEN

REFERENCE TO RELATED APPLICATION

This application is a continuation-in-part of application Ser. No. 09/225,227, filed Jan. 4, 1999, now U.S. Pat. No. 6,146,677 entitled High Efficiency Carousel Pizza Oven, which is a continuation-in-part of application Ser. No. 09/071,638, filed May 1, 1998, now abandoned.

BACKGROUND OF THE INVENTION

1. Field of Invention

The insant invention relates to the area of ovens for commercial and other large volume cooking, such as restaurant ovens. More particularly, the invention relates to an oven for the high efficiency cooking of several pizzas or other food items at the same time.

2. Description of the Prior Art

There have long been ovens for cooking food items, such as pizzas, in large quantities. A problem with these ovens has been that the persons operating the same must periodically rotate and reposition the items to achieve even and uniform cooking. Also, and even more importantly, has been the fact that pizza ovens and the like, as known in the prior art, require between ten and fifteen minutes to accomplish satisfactory and complete cooking thereof. Accordingly, a restaurant or so-called pizza parlor has been inherently limited in its capacity to furnish completed pizzas to customers by the period required for the cooking of a pizza therein; resulting in the revenue and income of a typical pizza restaurant being more a limitation related to the cooking speed of their ovens than the customer base itself. In addition, prior art pizza ovens do not utilize available heat efficiently and, resultantly, significant thermal values escape from the door of such prior art units thereby diminishing the cooking capacity of the oven, and increasing the energy demands thereof, increasing cooling requirements for the restaurant, and causing undue discomfort.

The prior art, as is best known to the inventor, is represented by U.S. Pat. No. 5,492,055 (1996) to Nevin, et al, entitled Pizza Oven. Such art however does not combine overhead radiant heating with underside conductive heating through use of a rotating heat reservoir as is set forth herein.

SUMMARY OF THE INVENTION

The instant high efficiency carousel pizza oven is an oven of the open cavity or open input type which permits food access and fluid communication with the atmosphere through a proximal or front opening within the oven housing. The present oven is preferably defined in terms of a method which employs a solid rotating thermal reservoir in the nature of a circular panel capable of storing large amounts of thermal energy per unit of mass. Rotation of the panel assures that hot spots will not develop thereby eliminating scorching of food items cooked thereon. Provided beneath said panel, in thermal communication therewith, and preferably along a radius thereof situated substantially normal to an axis of rotation of said panel, is a flame burner which furnishes greater heat to the panel as a function of increase in distance from said axis to thereby provide cooking of uniform heating to the rotating panel as a function of increase in circumference relative to distance from the axis. Thereby, thermal values are very efficiently transferred from the gas burner flames to the panel which, through conduction, provides heating to the pizza through the bottom surface thereof. In a further step, there is provided an infrared energy source positioned within the oven but over said rotating panel to thereby provide heat into the region above the plane of rotation of said panel, this while directly striking the toppings of that pizza, this within a narrow area of said plane which is characteristic of the line of site function of heating by radiation. The relative intensities of the above forms of heat transfer are balanced through the use of a thermostat sensor located beneath the rotating panel. In such balancing, it is recognized that the heating by conduction which occurs beneath the rotating panel entails the use of a lower temperature, however with greater heat or energy content, while the infrared heat source positioned over said panel, i.e., the rotating thermal reservoir, entails use of a higher temperature, however in a much lower amount of total heat or energy in that the primary function of the latter is to provide cooking to the pizza toppings which is a more delicate cooking function than is that of baking of crust of the pizza from beneath.

The present inventive method also makes use of heating by convection through the provision of a geometry at a rear or distal region of the oven which, in combination with said infrared element, creates a region of high temperature which is optimal for high efficiency cooking of food types such as pizza. Further integral to the present method, and associated with the use of such a region of high temperature cooking, is the passing, at a rate of 0.5 to 3.0 rpm of the food item into and out of such region to preclude scorching thereof while gaining benefits of taste. Further heating by convection is accomplished by circulating otherwise unused heat, beneath the rotating panel, radially outwardly and then upwardly beyond the periphery of the panel and into the region thereabove. This is further accomplished through internal venting and circulation means within the top of the oven. As such, three forms of heat transfer, namely, conduction, radiation and convection are employed in a balanced fashion in the context of open cavity fluid communication with the atmosphere in order to provide the within objects the advantages thereof.

It is accordingly an object of the present invention to provide an improved method of cooking, having particular application in commercial pizza service establishments, which operates at improved efficiency, providing increased food access, improved taste, and reduces energy consumption for both the oven itself and cooling of the ambient work station.

It is another object to provide a food item cooking oven for cooking of each food item therein evenly and without need of opening a door or entrance thereof to rotate or reposition food items and wherein the efficiency of the oven is not compromised when food items are removed from or repositioned therein.

It is a further object of the invention to provide a novel method of heating to provide a cooking oven which is reliable and relatively inexpensive to manufacture.

It is yet a further object to provide a method of cooking which employs a rotating thermal reservoir as a cooking substrate and, in combination therewith, balanced means of conduction heating of the bottom of said panel, heating the top of the food items to be cooked, and heating by convection throughout the oven, this inclusive of a region of high temperature cooking into which the food periodically passes in and out of to thereby obtain the benefits of high temperature cooking without risk that food items to be cooked may become scorched or overcooked.

The above and yet other objects and advantages of the present invention will become apparent from the hereinafter set forth Brief Description of the Drawings, Detailed Description of the Invention and Claims appended herewith.

DETAILED DESCRIPTION OF THE INVENTION

Figure 1:
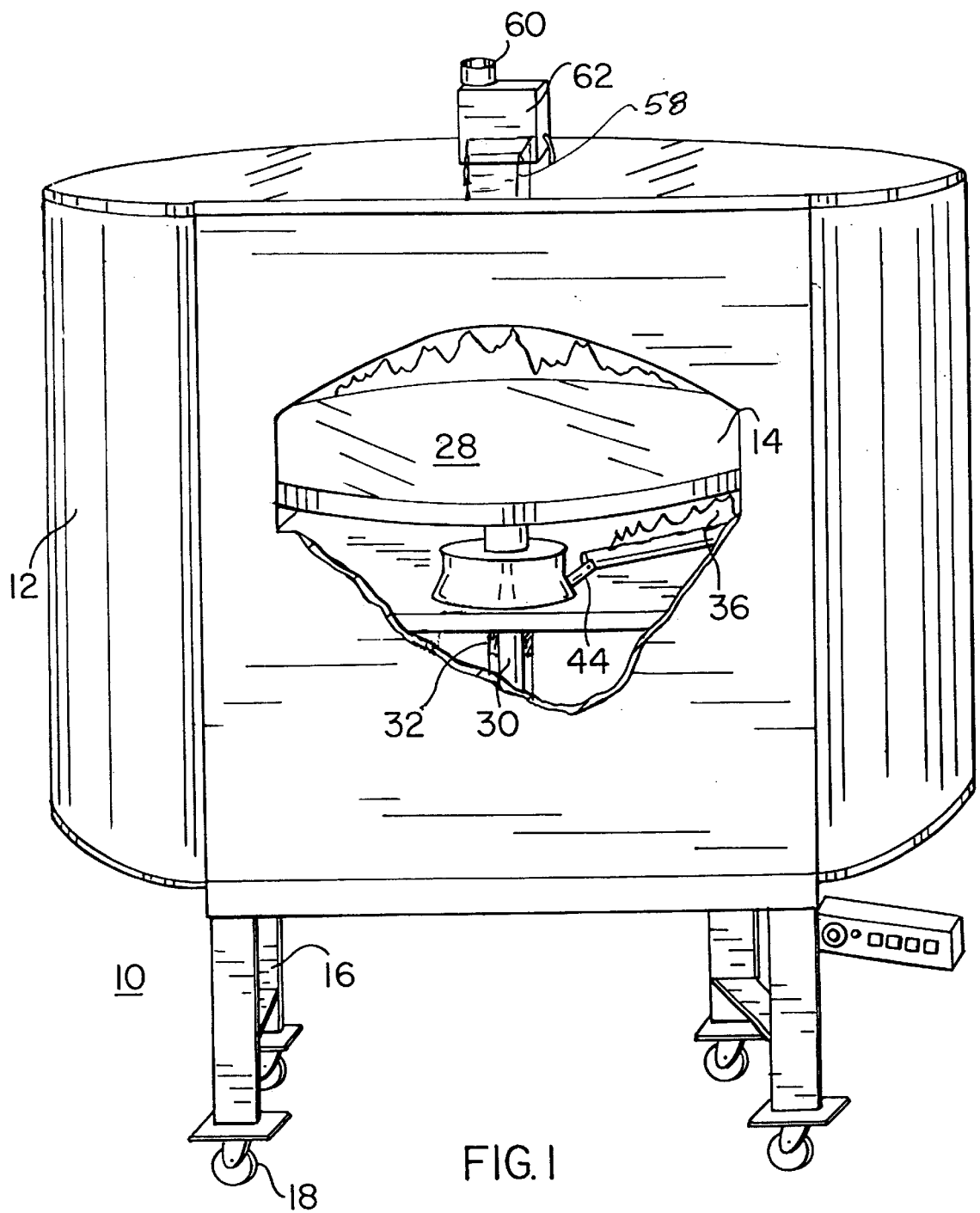
FIG. 1 is a perspective front cut-away view of an oven in accordance with the present inventive method, showing the atmospheric communication food access opening.

The preferred embodiment of the present inventive method may be seen with reference to the below-described cooking oven 10. More particularly, oven 10 includes a housing 12 having a generally cylindrical envelope (see FIG. 1) this including a generally circular horizontal cross-section (see FIG. 5). The housing 12 is further characterized by a front or proximal access opening 14 located at the front or proximal portion of the oven 10. Said food opening 14 provides for open cavity fluid communication between the oven interior and the atmosphere. As may be noted in FIG. 1, the oven 10 may, if desired, be mounted upon a plurality of legs 16 which may or may not include swivel wheels 18 thereon. Alternatively, oven 10 may be placed upon any stable surface within the establishment making use thereof.

Figure 2:
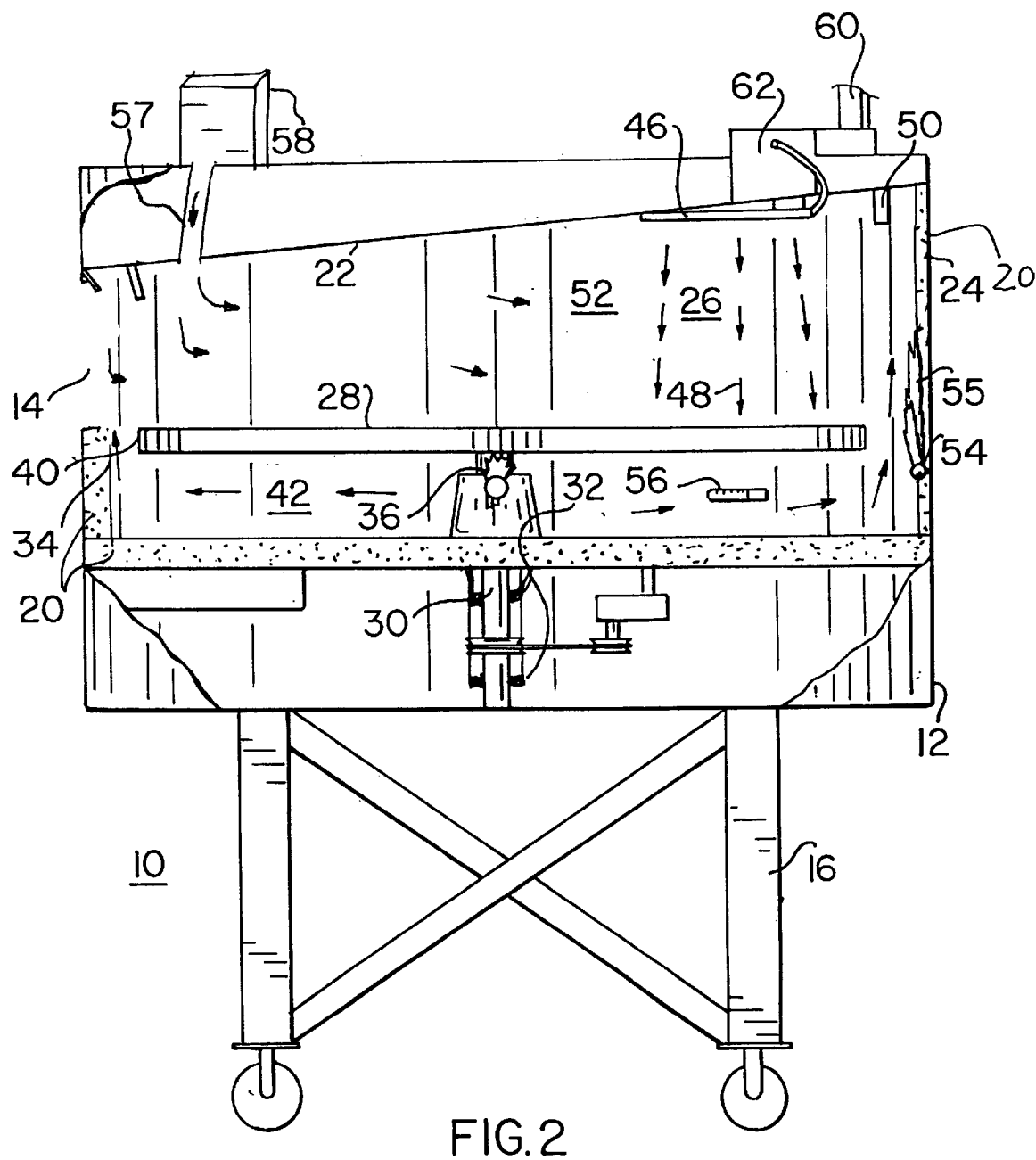
FIG. 2 is a side diametric cross-sectional schematic view thereof.

With further reference to the structure of oven 10, it may (see FIG. 2) be seen that the housing 10 includes an insulative floor 20 and an internal ceiling 22 which slopes upwardly from the proximal access opening 14 to a rear surface 24 of the oven at a pitch of about eight percent, that is, one unit of increase in height for each twelve units of distance from front to back of the oven, to define the slope of the internal ceiling 22. At the right of FIG. 2 is defined a region 26 of high temperature or intense cooking (see also FIG. 5), which is more fully described below.

The most notable feature within the interior of housing 12 is that of a preferably circular cooking panel 28, formed of a material for such as calcium aluminate, which is able to store large quantities of heat and to withstand temperatures of at least 2200 degrees F., although this specific tolerance level is not required for proper oven operation. Panel 28 is therefore formed of a high thermal capacity material, the measurement of which is about 0.235 BTU/LB/° F. or 75,000 BTU's.

The panel 28 is rotatably mounted upon an axle 30 which includes journal means 32. The specifics of such mounting and gearing for rotation of panel 28 are more fully described below. As may be noted with reference to FIGS. 2 and 3, cooling panel 28 exhibits a diameter relative to the diameter of housing 12 such that an annular area 34 exists between the outer periphery of the panel 28 and the interior dimension of housing 12.

With reference to FIGS. 1, 2, 3 and 5, may be seen a substantially linear elongate gas burner 36 which is positioned underneath and within thermal communication of panel 28, preferably such that flames therefrom touch panel 28. Said burner, as may more particularly be noted, with reference to FIGS. 1, 3 and 5, extends radially outwardly from axis of rotation 38 (see FIG. 5) toward peripheral edge 40 of the panel 28. As may be noted in said figures, burner 36 is preferably near the rear or distal side of oven 10 to produce greater heating toward the rear of the oven and away from the food access opening 14. Therefore, burner 36 is preferably situated in region 26 of intensified heating.

Figure 3:
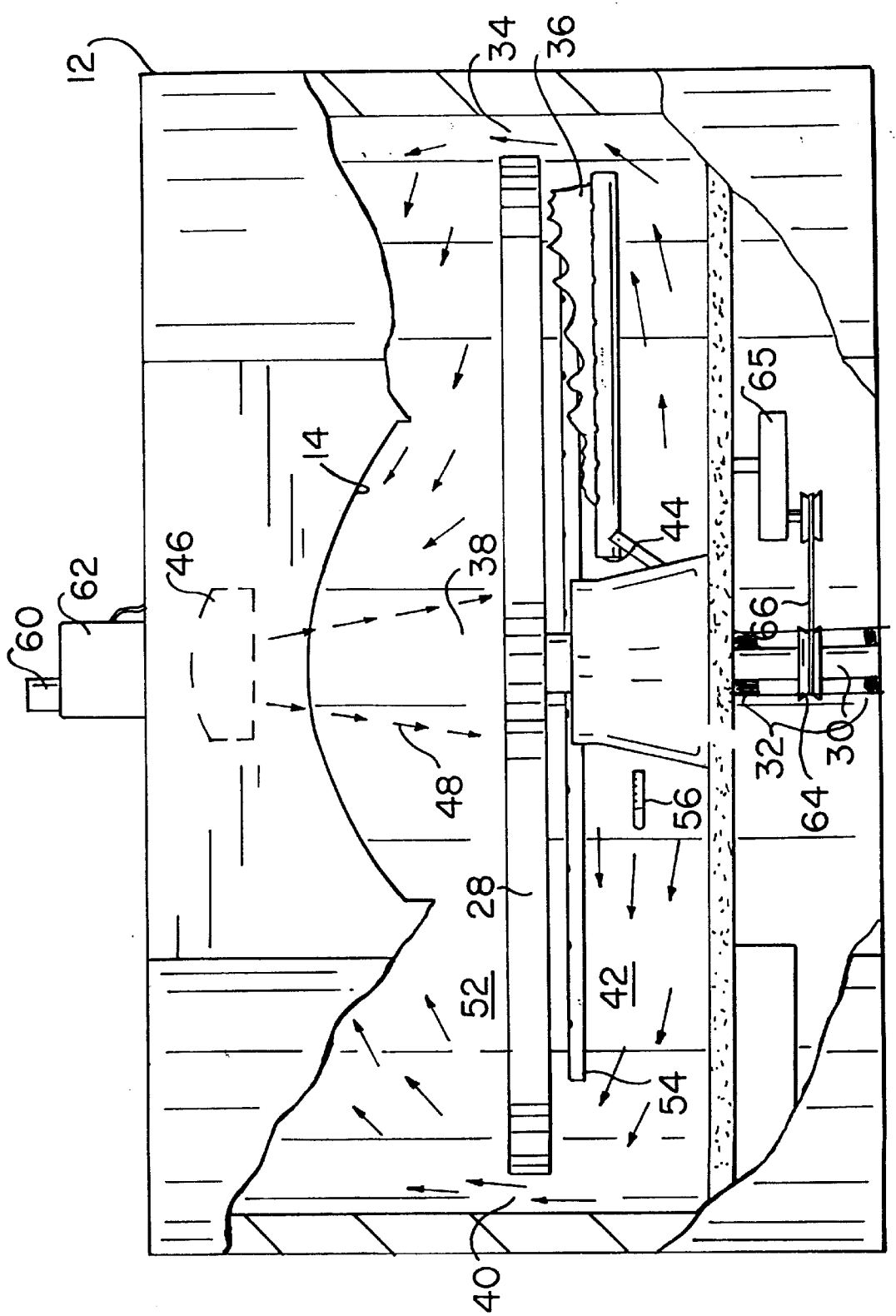
FIG. 3 is a front diametric cross-sectional schematic view taken at an angle of about ninety degrees relative to the view of FIG. 2.

A space 42 beneath panel 28 is relatively small so that minimal heat is spent in this region. Resulting, most of the energy output of burner 36 is directed to the bottom of the panel 28 which, after the oven is started for a given day's activity, acts to eventually fill the thermal reservoir to a considerable percent of its thermal capacity. It may, with reference to FIG. 3, be noted that the flame of burner 36 becomes progressively wider and otherwise more intense from the axis of rotation of panel 28 to the peripheral edge 40 thereof, this to compensate for the increasing panel area which occurs as a function of increase in radius of the panel from the axis 30 of rotation thereof. A gas input 44 to the burner 36 is shown in FIGS. 1 and 3. In view of the above, it may be appreciated that by virtue of gas combustion against the lower surface of panel 28, heat will be stored in the panel and communicated by conduction to the bottom of any pizza or food item upon the surface of the panel. As such, crust heating occurs from the bottom of the pizza through this process. Because of the substantial thermal capacity of panel 28, continuous and uniform heating is provided until panel 28 reaches a high temperature of about 700 degrees Fahrenheit at which temperature the thermostat causes cycling of burner 36.

Figure 8:
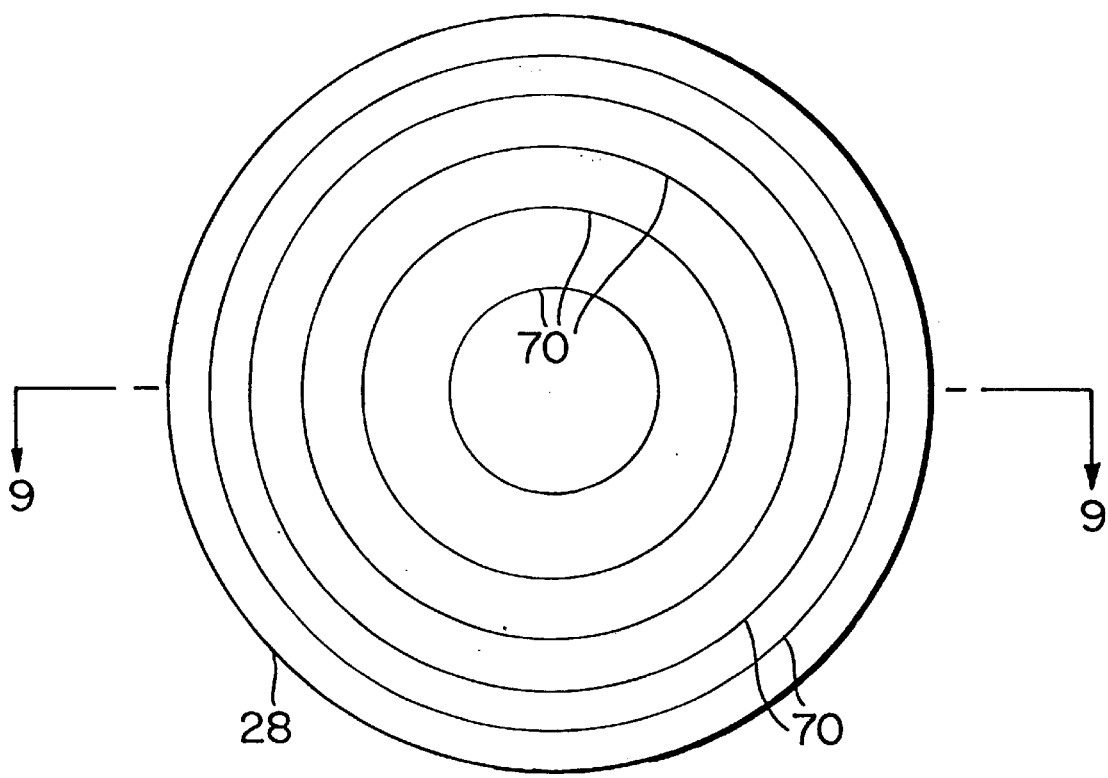
FIGS. 8 and 9 are views of an alternative embodiment of the cooking panel.
Figure 9:
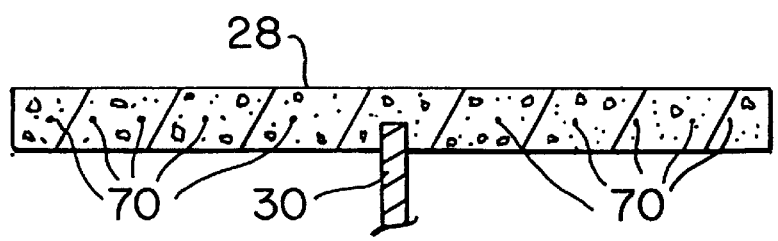

Alternatively to the above referenced use of burner 36, electric resistance heating elements 70 (see FIGS. 8 and 9) may be selectively distributed internally to panel 28 and supplied with power through electrical induction from induction means (not shown) provided upon axle 30 as a part of the journalling of panel 28 upon the axle.

Through the use of an infrared radiant heat source 46, a temperature of about 1750 degrees F. energy is applied within a focused area 48 (see FIG. 2) on the panel 28 within said region 26 of intensified heating. It is to be appreciated that infrared energy source 46 is a high temperature, but lower heat or thermal value device than is burner 36. In other words, while the temperature radiated by source 46 to the pizza crust is substantially higher than the 700 degree F. temperature of panel 28, the quantity (BTU's) of heat applied to the topping side of the pizza is much lower than the quantity of heat applied at the bottom of crust side. That is, infrared energy, while high in intensity within its area of focus 48, does not exhibit the heat transfer capacity of conductive heating means such as said burner 36. Such high temperature, cooking of the topping of the pizza is highly desirable in accelerating the cooking process without scorching of the topping, this in combination with the continuous rotation of panel 28 and its associated pizzas in and out that region 26 of intensified heating.

It is to be noted that infrared radiant heat source 46 may be adjusted to higher or lower energy levels to enable cooking of food items other than pizza. Further, solid state ignition, or an entirely solid state infrared element, may be employed in lieu of the use of perforated ceramic modules which emit a gas-air mixture which combusts on a surface of the burner so that heating of the ceramic modules causes infrared radiation to be emitted.

Distal of radiation heat source 46 is a deflector 50 (see FIGS. 2 and 5) the function of which is to contain convection heat within the heating chamber 52 which is collected on the ceiling of region 48.

It is noted that the interior surface of the heating region of the oven is provided with an entirely black finish as, for example, may be effected through application of a black protective layer to the metallic material of which housing 12 is formed. Such a black interior surface is important in terms of uniform heating and efficient use of energy. This is achieved through the use of the phenomenon known as black body radiation which dictates that an enclosed black surface will absorb more of the infrared energy relative to the amount of radiation reflected back in the direction from which radiation was received. This phenomenon increases the efficiency of the use of the radiant heat source 46 described above, this by containing the energy within oven interior and not reflecting it out through the opening 14 thereof.

At the rear of oven regions 42 and 52 is optionally provided a flicker flame manifold 54 (see FIG. 2) which extends vertically across the rear of the oven interior and serves not only to provide a pleasing wood burning appearance, but also to furnish additional heat within the rear of the oven housing. That is, to region 26 of intensified heating to thereby increase cooking efficiency, through radiation, of the entire system. Flicker flame 55 of manifold 54 burns at approximately 1000 degrees F. It is however to be understood that the insant inventive method will function, although at a slightly reduced efficiency, without the use of the flicker flame 55 or flicker flame manifold 54. Alternatively to the use of gas as the source of energy for flicker flame 55, solid state means or intermittently activated phosphorus within an inert gas filled tube or flame-shaped glass envelope may be employed.

Further to the above, it is to be appreciated that three distinctive forms of heat transfer are employed in the present method, i.e., baking of the pizza crust by conduction underneath from panel 28, top heating by radiation from radiant element 46, and through convection from heat values of radial flame burner 36 which are not communicated to panel 28 and which, thereby, pass around lower region 42, thorough annular area 34 of the oven, into upper cooking region 52 and, therefrom, into region 26 of high temperature heating. The relative intensity of all three of the above forms of heat transfer must be carefully balanced for the particular type of food item to be cooked to obtain optimal results. Such balancing is controlled through the use of a thermostatic probe 56 (see FIGS. 2 and 3) in region 42 and through the use or electrical control of gas input 44 into flame burner 36 of the quantity of gas to the infrared heat source 46.

Figure 5:
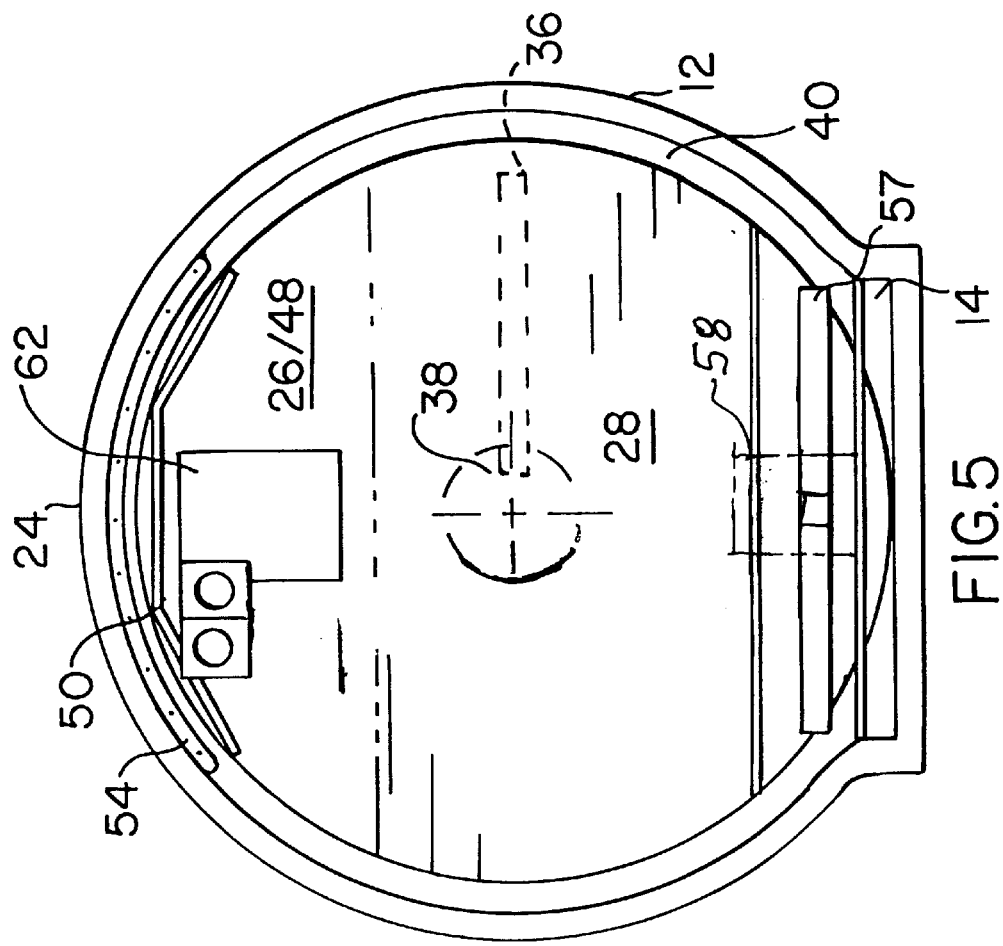
FIG. 5 is a top breakaway view of the oven, showing the region of high temperature cooking and parts of the heat convection assembly.
Figure 4:
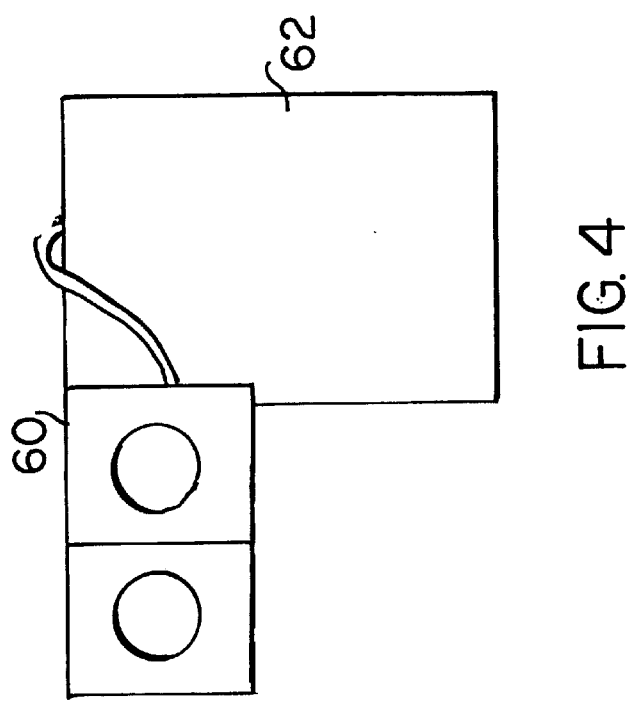
FIG. 4 is a top plan view of the heat convection assembly as it appears at the top of the oven housing.

As above noted, yet additional heating by convection is obtained by regulation of the output of the flicker flame manifold 55. It is noted that through the use of region 26 of intensified heating, the otherwise adverse effect of open cavity entrance 14, and its fluid communication with the atmosphere, is overcome. In other words, by providing said region 26 at said distal or rear part of the housing 12, the effect of the continuously open food access opening 14 is compensated. Therewith, the many benefits of flavor associated with such atmospheric communication cooking as, for example, is described in my U.S. Pat. No. 5,560,285 is effected. In addition, through such design, the exterior of the oven housing 12 remains relatively cool, with only two inches of housing insulation. Also, the only heat which necessarily must be exhausted from the system is in connection with flicker flame 55. Cooking and energy efficiency are thereby maintained, this particularly through the control of convected air by means of blower 58 through input 57 and therefrom back into upper region 52, as is shown in FIG. 5. A flue 60 is provided if, upon balancing of the above described heat transfer forms, it is determined necessary to exhaust heat from the system. However, unused combustion gases are effectively removed thru flue 60.

More particularly the control of convected air by means of blower 58 through input 57, which results in a negative air pressure assists combustion and efficiency of the radiant burner 46. Said burner is enhanced with a forced hot air stream obtained by diverting exhaust gases through plenum 62 which in turns collects excess gases and distributes them in part to radiant burner 46 and in part to flue 60 to be exhausted. That is, input 57 exerts control over and directs hot air rearward, before it escapes through proximal opening 14, plenum 62 then divides the air by injecting an and injects an air stream into a venture of radiant burner 46. The unused air is then exhausted outside through flue 60.

Figure 6:
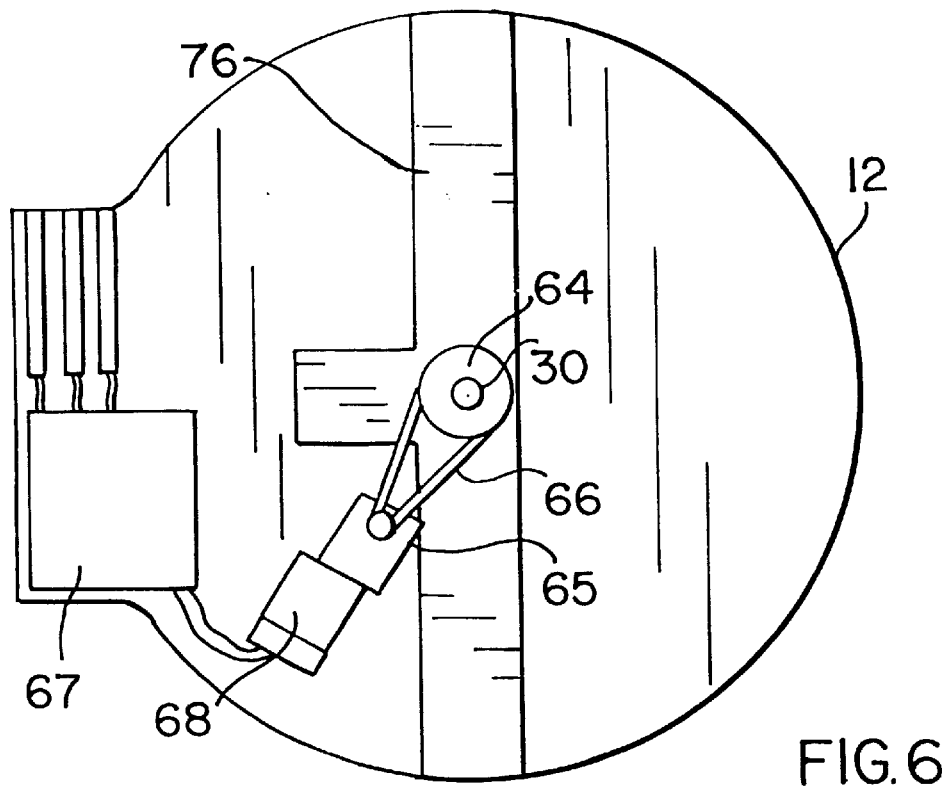
FIG. 6 is a view of a chain drive motor assembly for rotating the heat reservoir panel.

Pieces of wood may be optionally placed near the center of panel 28 to smolder adding flavor to cooking pizza and food items located outwardly from the axis of rotation With reference to the bottom view of FIG. 6, it may be seen that axle 30 is rotated by a shaft sprocket 64 connected to a drive motor 68 through a gearbox 65 by means of a chain 66. The oven is preferably equipped with pedal control means (not shown) to momentarily stop panel 28 from rotation for ease of introduction or removal of pizza and food items from the oven by a novice.

Figure 7:
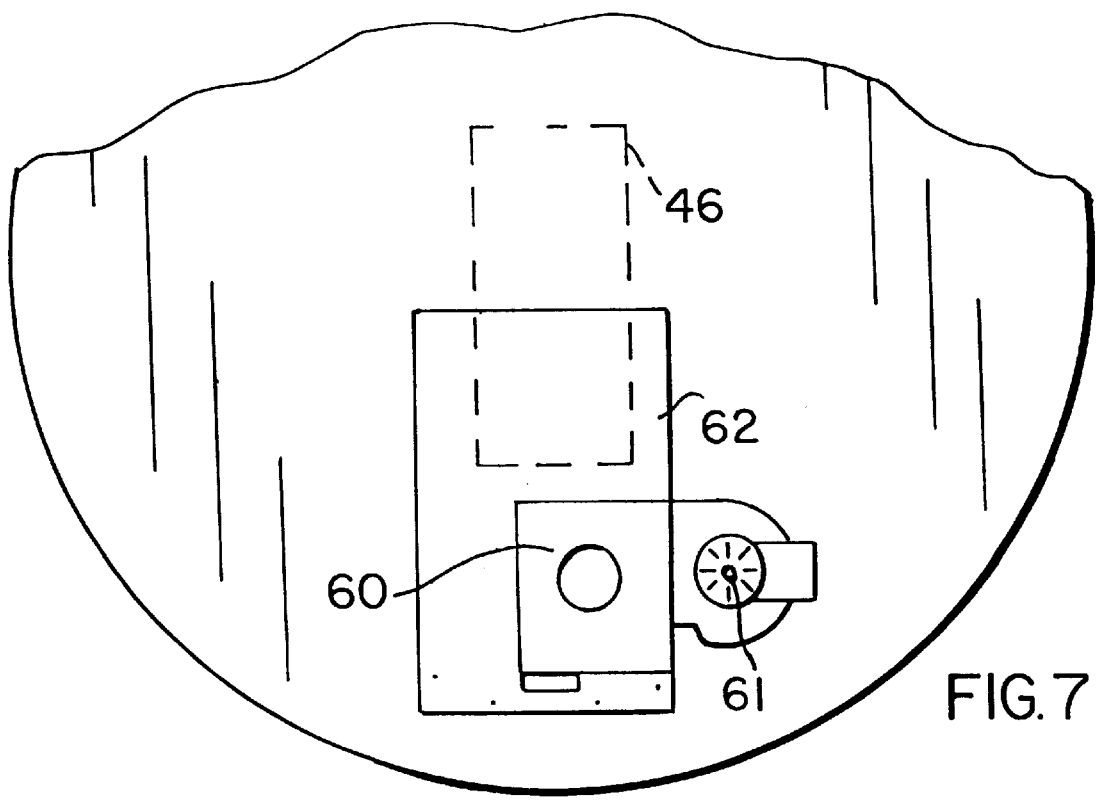
FIG. 7 is a partial top perspective view of the oven, showing the plenum, flue, and chimney thereof.

In the top view of FIG. 7 is shown plenum 62, above infrared heat source 46, which contributes to the positive air pressure at input 57 (see FIGS. 2 and 5) by and through the fan 58. Air is thereby exhausted out of the proximal area of region 52 by fan 61, whereby air is moved across the food access opening 14 creating a venturi effect. As a result, smoke from the optional burning wood pieces, referenced above, is brought distally out and through oven chimney 60.

Resultant of the above-described structure by which the present inventive method may be practiced, one may cook at a temperature of 1000 degrees F. within region 26 because the topping of the pizza is heated by the overhead infrared radiant heat source 46. Additionally, such a high temperature may be employed within region 26 because the continuous rotation of the pizza or food item ensures it will only momentarily be exposed to such high heat and, thereby, will not scorch the top thereof. Therein, one avoids the well known problem with prior art pizza ovens which requires that the cook reach into the oven to move pizza therein into hotter or cooler spots because of lack of uniform temperature therewithin. Prior art ovens are limited to a 450–500 degree F. internal temperature due to the above-mentioned restrictions.

Also, as above noted, the lack of any door or permanent closure to the oven affords the benefits of atmospheric communication heating above set forth.

Inasmuch as the system is provided with its internal thermostatic probe 56, there is no need to turn the system off during slow periods during the business day. In terms of construction, housing 12 preferably includes inner and outer walls or shells which are spaced about two inches apart from each other with two one-inch layers of insulation therebetween. The inner shell (the interior surface of which is subject to the above-reference coating) is optionally made of a 12 gauge A36 mild steel, but can be made of other forms of steel and other materials as well.

Summarizing the thermodynamics of baking a pizza in accordance with the invention, firstly, the crust has to bake; secondly, the cheese has to melt; and thirdly, the toppings have to get heated and amalgamated with the cheese to make the pizza a palatable, pleasant looking and tasting food. In this process, by virtue of fact that the panel 28 is very hot, baking of the crust can be accomplished in less than two minutes. To manage the problem of melting the cheese and heating the toppings, the invention employs infrared energy which is line-of-site specific and, for a very short time as the pizza on the deck rotates through the line-of-site, the pizza passes through the intensive heat area 26 and under the infrared element 46 which causes the cheese to melt rapidly and the toppings to become heated. Using this method, the time necessary for the cheese and topping conversion is less than two minutes. Because this is so quickly accomplished, one obtains the benefit of having a higher panel temperature to thereby bake the crust much quicker than the normal pizza oven which uses a 450 to 500 degree F. panel and ambient temperature within the convection heated region 52. This would normally be a restricting factor because at such temperatures the cheese and toppings require twelve to fifteen minutes to become fully cooked and ready for serving. However, with the use of temperatures herein, one achieves an increase in panel temperature to achieve a baking time of the crust of two minutes while simultaneously melting the cheese and cooking the toppings, this allowing one to cook the product in a much reduced time. In addition, the quality of the product, including flavors and tastes of the toppings, are of a much higher quality than occur from slower cooking conventional pizza ovens.

While there has been shown and described the preferred embodiment of the instant invention it is to be appreciated that the invention may be embodied otherwise than is herein specifically shown and described and that, within said embodiment, certain changes may be made in the form and arrangement of the parts without departing from the underlying ideas or principles of this invention as set forth in the Claims appended herewith.

What is claimed is:

1. A high efficiency infrared oven for cooking a plurality of food items comprising:
   (a) a housing having a housing wall including a proximal permanent food access opening for inserting and removing food products to be processed to thereby provide a continuous and uninterrupted fluid communication with the ambient atmosphere;
   (b) a high thermal storage capacity food product support panel horizontally and rotationally mounted within said housing;
   (c) means for conductive heating of said support panel for delivering heat into said panel to, therefrom, conducively transfer stored heat into food products placed upon said panel; and
   (d) at least one infrared energy source oriented to deliver heat to a surface of said support panel as the same rotates to provide thereon a region of intensified cooking, into and out of which food items pass as said food product support panel is rotated.

2. The oven as recited in claim 1 in which said panel heating means is elongated and oriented between an axis of rotation of said support panel and a periphery thereof.

3. The oven as recited in claim 2, further comprising:
   means for effecting circulation throughout the oven interior of thermal values of said heal panel source not transferred to said rotating food item panel.

4. The oven as recited in claim 3, further comprising:
   thermostatic or control means for balancing temperature and thermal output of said burner and overhead infrared source.

5. The oven as recited in claim 4, further comprising:
   a black surface comprising an interior of said oven to thereby utilize phenomenon of black body radiation to contain in the oven interior radiance energy from said infrared heating source not utilized within said region of intensified heating.

* * * * *